US011138713B2

(12) United States Patent
Okamura

(10) Patent No.: US 11,138,713 B2
(45) Date of Patent: Oct. 5, 2021

(54) CAMERA ABNORMALITY DETECTING DEVICE AND PROGRAM

(71) Applicant: TOSHIBA TEC KABUSHIKI KAISHA, Tokyo (JP)

(72) Inventor: Atsushi Okamura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 16/521,693

(22) Filed: Jul. 25, 2019

(65) Prior Publication Data
US 2020/0126206 A1 Apr. 23, 2020

(30) Foreign Application Priority Data

Oct. 18, 2018 (JP) .............................. JP2018-196726

(51) Int. Cl.
*G06T 7/00* (2017.01)
*H04N 17/00* (2006.01)
*G07G 1/00* (2006.01)
*G08B 21/18* (2006.01)

(52) U.S. Cl.
CPC ......... *G06T 7/0002* (2013.01); *G07G 1/0036* (2013.01); *G08B 21/182* (2013.01); *H04N 17/002* (2013.01); *G06T 2207/30168* (2013.01)

(58) Field of Classification Search
CPC ................................................... G06T 7/0002
USPC ........................................................ 348/150
See application file for complete search history.

(56) References Cited

U.S. PATENT DOCUMENTS

| 2013/0046644 | A1 | 2/2013 | Sano |
| 2017/0140360 | A1 | 5/2017 | Naito |
| 2018/0218224 | A1* | 8/2018 | Olmstead ................. H04N 7/18 |
| 2018/0218351 | A1* | 8/2018 | Chaubard .............. H04N 7/181 |
| 2019/0212125 | A1* | 7/2019 | Deleule ................. G01S 7/4808 |

FOREIGN PATENT DOCUMENTS

JP        2008-40999        2/2008

OTHER PUBLICATIONS

Extended European Search Report for European Patent Application No. 19193332.4 dated Feb. 21, 2020.
European Office Action for European Patent Application No. 19193332.4 dated Jun. 23, 2021.

\* cited by examiner

*Primary Examiner* — Yulin Sun
(74) *Attorney, Agent, or Firm* — Amin, Turocy & Watson, LLP

(57) ABSTRACT

A camera abnormality detecting device according to an embodiment includes an acquiring section and a notifying section. The acquiring section acquires, from an image photographed by a camera provided in a conveyance body to be capable of photographing an inside of a basket placed on a basket receiving section of the conveyance body, an image of a region where an upper edge of the basket is surmised to be reflected. The notifying section notifies, based on the image acquired by the acquiring section, whether an angle of view of the camera is blocked.

21 Claims, 8 Drawing Sheets

CAMERA ABNORMALITY DETECTING DEVICE AND PROGRAM

CROSS-REFERENCE TO RELATED APPLICATION

This application is based upon and claims the benefit of priority from Japanese Patent Application No. 2018-196726, filed in Oct. 18, 2018, the entire contents of which are incorporated herein by reference.

FIELD

Embodiments described herein relate generally to a camera abnormality detecting device and a program for causing a computer to function as the camera abnormality detecting device.

BACKGROUND

In recent years, a cart POS (Point Of Sales) system has been proposed for a small store equipped with shopping carts. In the following explanation, the shopping cart is referred to as cart. In the system, an information terminal including a touch panel and a scanner is provided in the cart. If placing a purchased commodity on the cart, a customer using the cart causes the scanner to read an identification code of the purchased commodity and performs commodity registration. Since the customer himself or herself performs the commodity registration while performing shopping in this way, it is possible to reduce congestion in an accounting area, at a so-called register. Further, if a self-type accounting machine is used, the customer can perform registration to accounting of purchased commodities thoroughly by himself or herself.

On the other hand, in the case of the cart POS system, if a customer puts a purchased commodity in a basket placed on a basket receiving section of the cart in a selling area where commodities are displayed, the customer performs commodity registration by himself or herself. A store clerk cannot easily monitor the customer. Therefore, it is conceivable to monitor the customer by setting a camera in the cart to be able to photograph the basket in the basket receiving section. However, even if the camera is set in the cart, the camera cannot photograph the basket if an angle of view of the camera is blocked. Therefore, there is a concern that a monitoring effect by the camera decreases.

DETAILED DESCRIPTION

An object of embodiments is to provide a camera abnormality detecting device and a program for the camera abnormality detecting device that can detect, on a real-time basis, a situation in which an angle of view of a camera is blocked and can improve a monitoring effect by the camera.

According to an embodiment, a camera abnormality detecting device includes an acquiring section and a notifying section. The acquiring section acquires, from an image photographed by a camera provided in a conveyance body to be capable of photographing an inside of a basket placed on a basket receiving section of the conveyance body, an image of a region where an upper edge of the basket is surmised to be reflected. The notifying section notifies, based on the image acquired by the acquiring section, whether an angle of view of the camera is blocked.

Embodiments of a camera abnormality detecting device that can detect, on a real-time basis, a situation in which an angle of view of a camera is blocked and can improve a monitoring effect by the camera are explained below with reference to the drawings. In the embodiments, a situation in which an angle of view of a camera attached to a cart used in a full-self-type cart POS system is blocked is detected as abnormality.

First Embodiment

Figure 1:
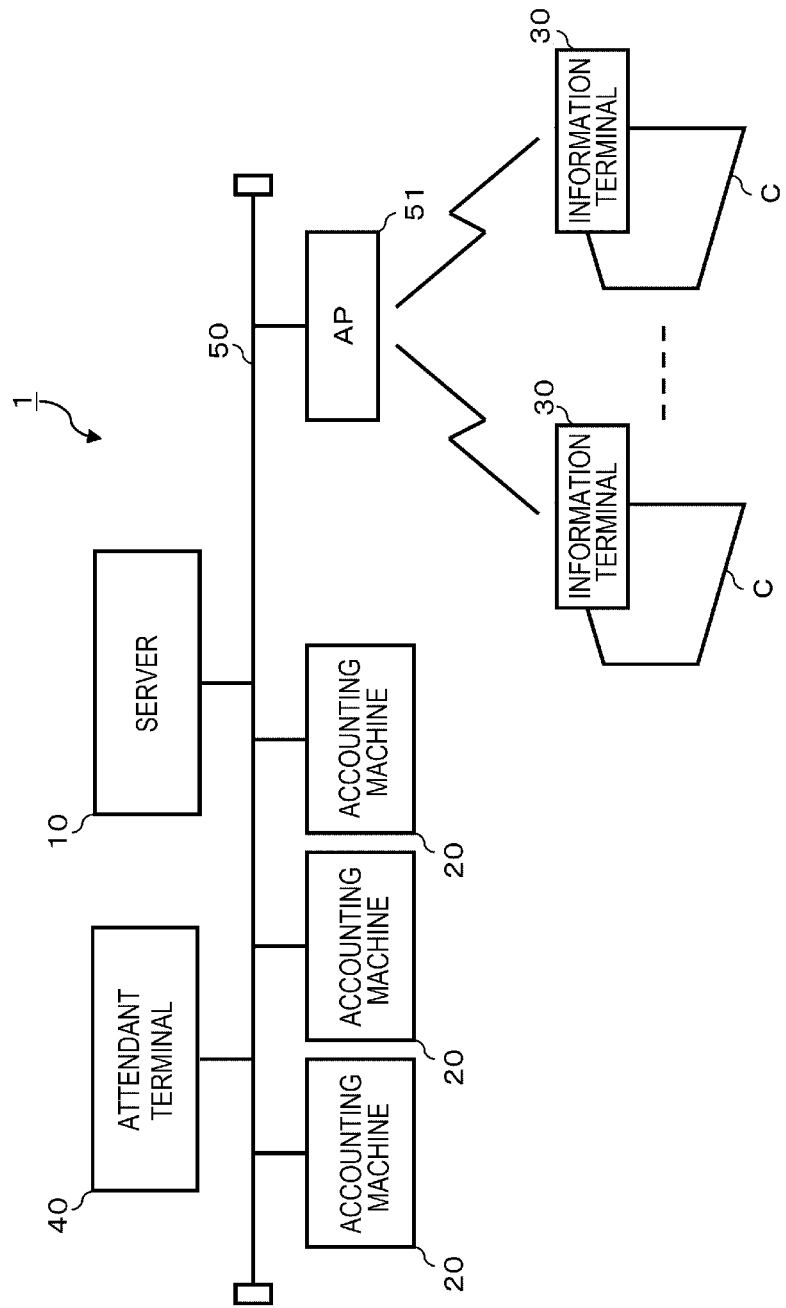
FIG. 1 is an overall configuration diagram of a cart POS system according to a first embodiment.

FIG. 1 is an overall configuration diagram of a cart POS system 1 according to a first embodiment. The cart POS system 1 includes a server 10, accounting machines 20, information terminals 30, and an attendant terminal 40. The information terminals 30 are respectively provided in a plurality of carts C. The cart C is an example of a conveyance body that conveys purchased commodities of a customer, who is a user of the cart C, put in a basket.

The server 10, the accounting machines 20, and the attendant terminal 40 are connected to a network 50 such as a LAN (Local Area Network). An access point 51 is also connected to the network 50. The information terminals 30 include wireless units. The information terminals 30 perform wireless communication with the access point 51. The access point 51 relays communication between the devices connected to the network 50, that is, the server 10, the accounting machines 20, and the attendant terminal 40 and the information terminals 30. Only one access point 51 is illustrated in FIG. 1. However, two or more access points 51 may be present depending on the size and the like of a store. Consequently, the information terminals 30 can perform data communication with the server 10, the accounting machines 20, and the attendant terminal 40 via the access point 51 and the network 50.

The information terminal 30 is a device with which a customer performs data input related to registration of purchased commodities by himself or herself. The accounting machine 20 is a device with which the customer performs accounting of the purchased commodities by himself or herself. The cart POS system 1 realizes a full-self system in which the customer performs the registration to the accounting of the purchased commodities by himself or herself. A plurality of accounting machines 20 may be set in one store. In FIG. 1, the cart POS system 1 in which three accounting machines 20 are set in one store is illustrated.

The attendant terminal 40 is provided in an attendant counter where a watchman, a so-called attendant is stationed. The attendant terminal 40 includes a display device for displaying states of the information terminals 30 and the accounting machines 20. The attendant monitors, on a real-time basis, the states of the information terminals 30 and the accounting machines 20 from information displayed on the display device.

The server 10 has a function of a virtual POS terminal between the information terminals 30 and the accounting machines 20. That is, the server 10 creates list data of purchased commodities from data input in the information terminal 30. The server 10 specifies a customer who uses the accounting machine 20 and transmits list data of purchased commodities of the customer to the accounting machine 20.

Figure 2:
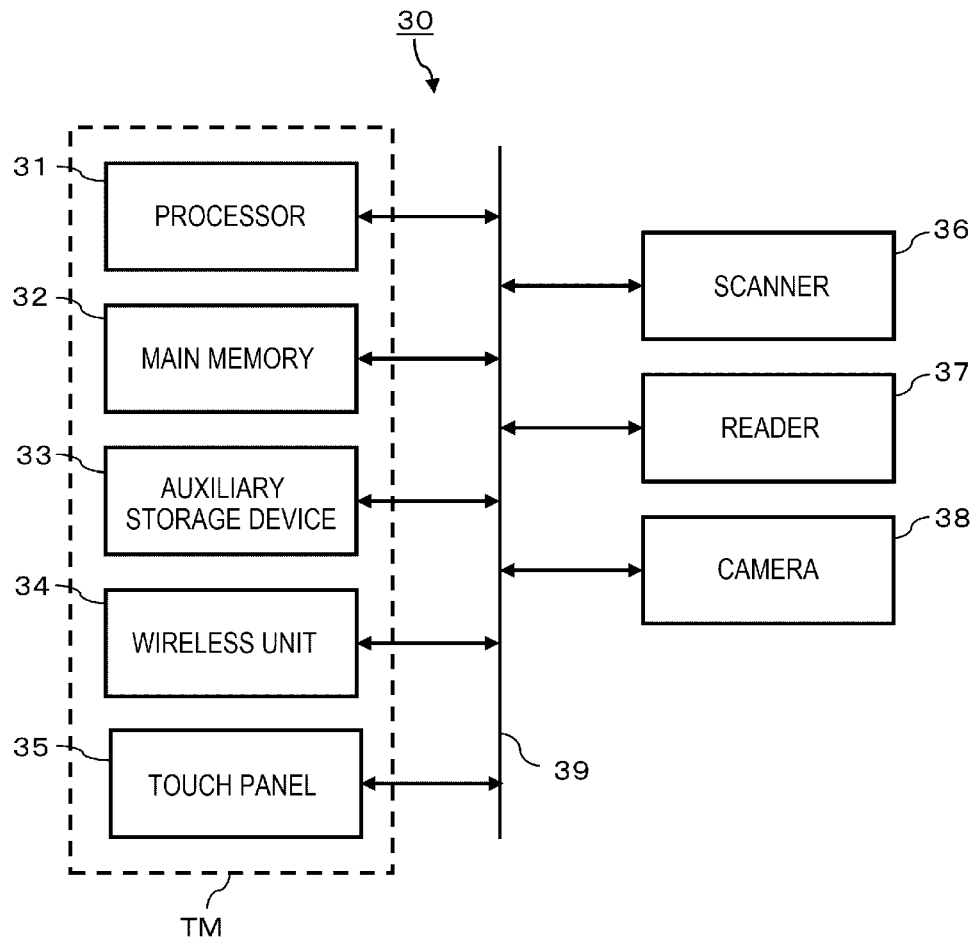
FIG. 2 is a block diagram illustrating a main part circuit configuration of an information terminal in the first embodiment.

FIG. 2 is a block diagram illustrating a main part circuit configuration of the information terminal 30. The information terminal 30 includes a processor 31, a main memory 32, an auxiliary storage device 33, a wireless unit 34, a touch panel 35, a scanner 36, a reader 37, a camera 38, and a system transmission line 39. The system transmission line 39 includes an address bus, a data bus, and a control signal line. In the information terminal 30, the processor 31, the main memory 32, the auxiliary storage device 33, the wireless unit 34, the touch panel 35, the scanner 36, the reader 37, and the camera 38 are connected to the system transmission line 39. In the information terminal 30, a computer is configured by the processor 31, the main memory 32, and the auxiliary storage device 33 and the system transmission line 39 that connects these devices.

The processor 31 is equivalent to a central part of the computer. The processor 31 controls the sections according to an operating system or application programs in order to realize various functions of the information terminal 30. The processor 31 is, for example, a CPU (Central Processing Unit).

Figure 3:
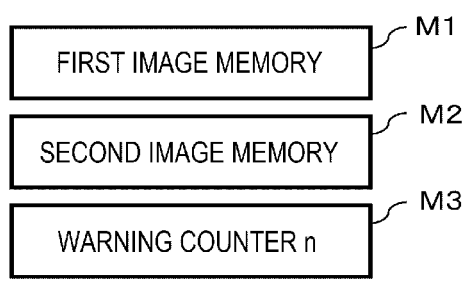
FIG. 3 is a schematic diagram illustrating a main work area provided in a main memory illustrated in FIG. 2.

The main memory 32 is equivalent to a main storage portion of the computer. The main memory 32 includes a nonvolatile memory region and a volatile memory region. The main memory 32 stores the operating system or the application programs in the nonvolatile memory region. The main memory 32 sometimes stores, in the nonvolatile or volatile memory region, data necessary for the processor 31 in executing processing for controlling the sections. The main memory 32 uses the volatile memory region as a work area where data is rewritten as appropriate by the processor 31. As illustrated in FIG. 3 in particular, the main memory 32 includes a first image memory M1, a second image memory M2, and a memory M3 of a warning counter n as the work area. The nonvolatile memory region is, for example, a ROM (Read Only Memory). The volatile memory region is, for example, a RAM (Random Access Memory).

The auxiliary storage device 33 is equivalent to an auxiliary storage portion of the computer. For example, an EEPROM (Electric Erasable Programmable Read-Only Memory), a HDD (Hard Disk Drive), or an SSD (Solid State Drive) can be the auxiliary storage device 33. The auxiliary storage device 33 saves data used by the processor 31 in performing various kinds of processing, data created by the processing in the processor 31, or the like. The auxiliary storage device 33 sometimes stores the application programs.

The wireless unit 34 controls wireless communication performed between the information terminal 30 and the access point 51 according to a wireless communication protocol.

The touch panel 35 is a device functioning as both of an input device and a display device of the information terminal 30. The touch panel 35 detects a touch position on a displayed image and outputs information concerning the touch position to the processor 31.

The scanner 36 reads a code symbol such as a barcode or a two-dimensional data code attached to a commodity. A code symbol representing an identification code of the commodity is attached to the commodity. The scanner 36 outputs data of the read code symbol to the processor 31. The scanner 36 may be a type for reading the code symbol with scanning of a laser beam or may be a type for reading the code symbol from an image captured by an imaging device.

The reader 37 reads data recorded in a recording medium and outputs the read data to the processor 31. If the recording medium is a magnetic card, the reader 37 is a magnetic card reader. If the recording medium is a contact IC card, the reader 37 is an IC card reader. In the case of a recording medium in which RFID (Radio Frequency Identification) is used such as a noncontact IC card or a smartphone, an RFID reader is used as the reader 37.

The camera 38 is provided in the cart C to be able to photograph a basket placed on the basket receiving section of the cart C from above. The camera 38 is a camera for monitoring whether a customer, who is a user of the cart C, correctly puts purchased commodities in the basket.

In the information terminal 30 including the circuit components explained above, the processor 31, the main memory 32, the auxiliary storage device 33, the wireless unit 34, and the touch panel 35 configure a tablet terminal TM. The information terminal 30 is configured by electrically connecting the scanner 36, the reader 37, and the camera 38 to the tablet terminal TM via the system transmission line 39.

Figure 4:
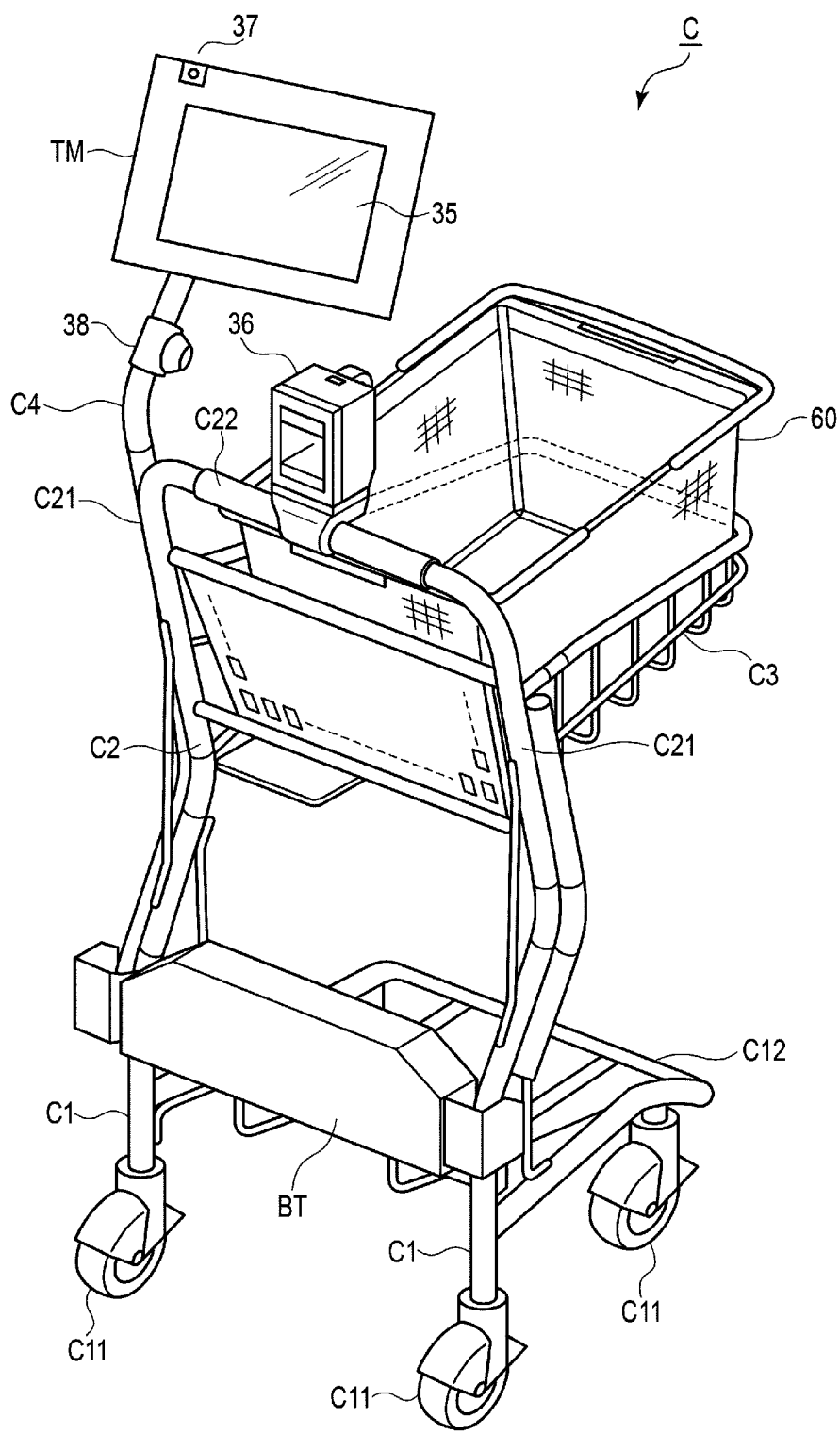
FIG. 4 is a perspective view illustrating an example of a cart in which the information terminal is provided in the first embodiment.

FIG. 4 is a perspective view illustrating an example of the cart C in which the information terminal 30 is provided. The cart C includes a caster section C1 for movement, a handle frame section C2, and a basket receiving section C3. The caster section C1 includes four wheels C11 for smoothly moving the cart C on a floor surface. The caster section C1 includes a receiving section C12 for placing a large baggage that cannot be put in a basket 60. The handle frame section C2 includes a pair of vertical frames C21, C21 erected on a rear wheel side of the caster section C1 and a handlebar C22 that couples upper ends of the vertical frames C21, C21. The basket receiving section C3 is present in the front of a halfway part of the handle frame section C2. In the cart C, the basket 60 provided in the store can be placed on the basket receiving section C3. The basket 60 is a basket for storing commodities.

The scanner 36 is present in a halfway part of the handlebar C22. The scanner 36 is attached to the handlebar C22 such that a reading window is located on the near side. The near side is a side where a customer holding the handlebar C22 and pushing the cart C stands.

A pole C4 is attached to one vertical frame C21. The distal end of the pole C4 is located above the handlebar C22. The tablet terminal TM is attached to the distal end portion of the pole C4 with a screen of the touch panel 35 facing the near side. The reader 37 is attached to the tablet terminal TM such that a card slit is located on the near side. In FIG. 4, the reader 37 is a magnetic card reader. The camera 38 is attached to a halfway part of the pole C4 to image the entire basket 60 placed on the basket receiving section C3 from above.

A battery BT is attached between the vertical frames C21, C21 on the lower end side of the handle frame section C2. The battery BT functions as a driving power supply for the tablet terminal TM, the scanner 36, the reader 37, and the camera 38.

Figure 5:
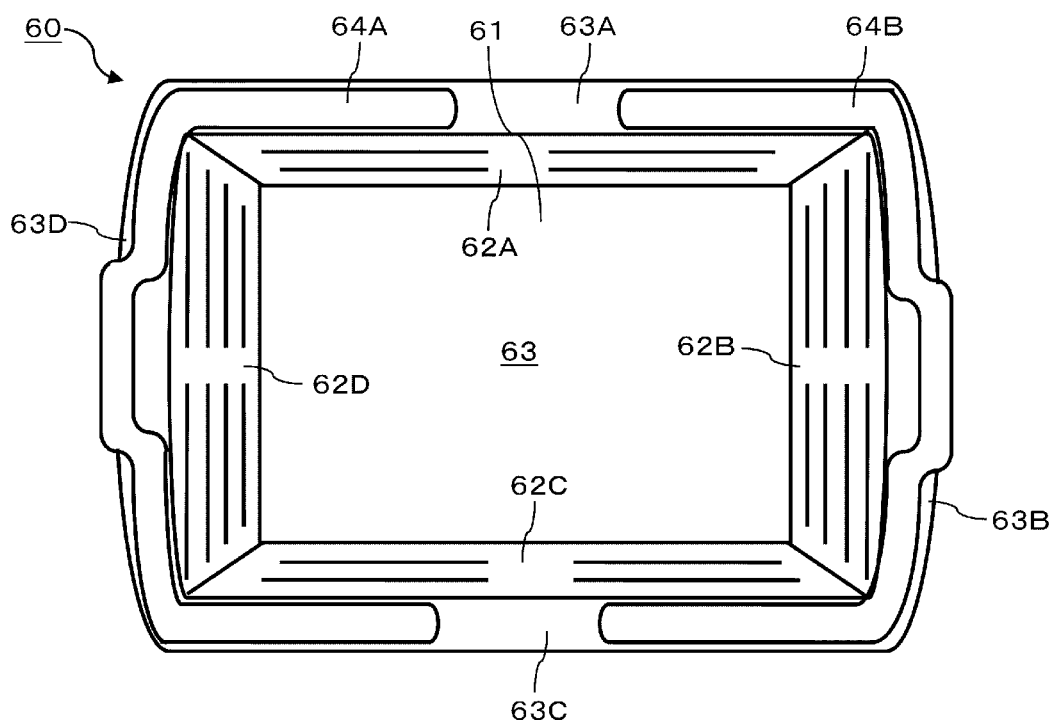
FIG. 5 is a top view of a basket placed on the cart in the first embodiment.

FIG. 5 is a top view of the basket 60. A storing section 63 opened in the upper surface is formed on the inside of the basket 60 by erecting sidewalls 62A, 62B, 62C, and 62D of four surfaces from edges of a rectangular bottom wall 61 to slightly incline to the outer side. In the basket 60, a pair of C-shaped handles 64A and 64B are attached to upper end portions 63A, 63B, 63C, and 63D of the sidewalls 62A, 62B, 62C, and 62D. One handle 64A is laid closer to the sidewall 62D between the upper end portions 63A and 63C of a pair of sidewalls 62A and 62C erected from edges in the longitudinal direction of the bottom wall 61 and is turnably supported with respect to the upper end portions 63A and 63C. If the handle 64A turns to the side of the sidewall 62D, the handle 64A comes into contact with the upper end portion 63D of the sidewall 62D. The handle 64A and the upper end portions 63A, 63D, and 63C overlap. The other handle 64B is laid closer to the sidewall 62B between the upper end portion 63A and the upper end portion 63C in the same manner and is turnably supported with respect to the upper end portions 63A and 63C. If the handle 64B turns to the side of the sidewall 62B, the handle 64B comes into contact with the upper end portion 63B of the sidewall 62B. The handle 64B and the upper end portions 63A, 63B, and 63C overlap.

As explained above, the camera 38 provided in the cart C photographs the basket 60 placed on the basket receiving section C3 from above. The basket 60 is placed on the basket receiving section C3 such that the longitudinal direction of the bottom wall 61 is parallel to a direction in which the cart C moves if a customer pushes the cart C. Therefore, if an empty basket 60 is placed on the basket receiving section C3, images of the basket 60 photographed by the camera 38 are substantially the same images, although the position of the basket 60 sometimes slightly deviates in the longitudinal direction of the basket 60. On the other hand, if commodities are stored in the storing section 63 of the basket 60, images of the storing section 63 are different for each of the baskets 60.

Figure 6:
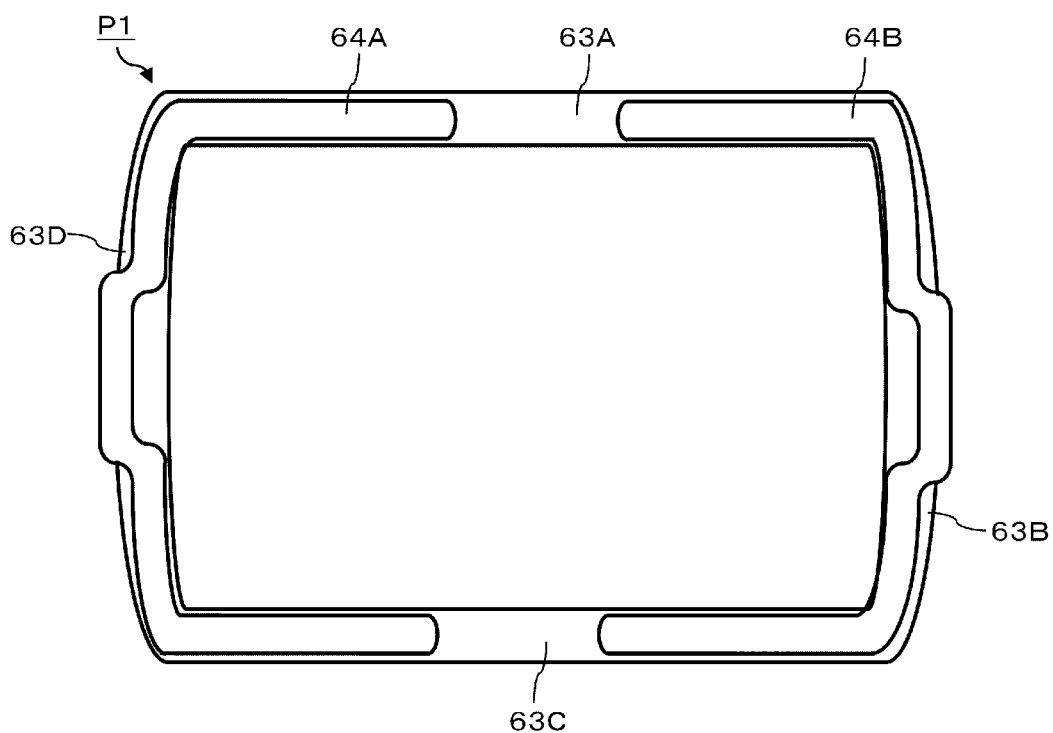
FIG. 6 is a schematic diagram for explaining a basic image in the first embodiment.

Therefore, in the first embodiment, as illustrated in FIG. 6, an image of the upper end portions 63A, 63B, 63C, and 63D of the sidewalls 62A, 62B, 62C, and 62D at the time when the basket 60 is viewed from above and the pair of handles 64A and 64B laid on the upper end portions 63A, 63B, 63C, and 63D is set as a basic image P1 and stored in the auxiliary storage device 33. The information terminal 30 segments, from the images photographed by the camera 38, a portion where the upper edge of the basket 60, that is, the upper end portions 63A, 63B, 63C, and 63D are surmised to be reflected and compares the portion with the basic image P1. If a matching rate is smaller than a first threshold A, the information terminal 30 determines that an angle of view of the camera 38 is blocked and notifies the customer or the attendant. The information terminal 30 has a function of a camera abnormality detecting device.

Operation in the first embodiment explained above is specifically explained below.

First, a customer who performs shopping using the cart C places the empty basket 60 on the basket receiving section C3. The customer touches the touch panel 35. If the touch panel 35 is touched, the processor 31 in an idle state starts. The processor 31 starts information processing of a procedure illustrated in a flowchart of FIG. 7.

Figure 7:
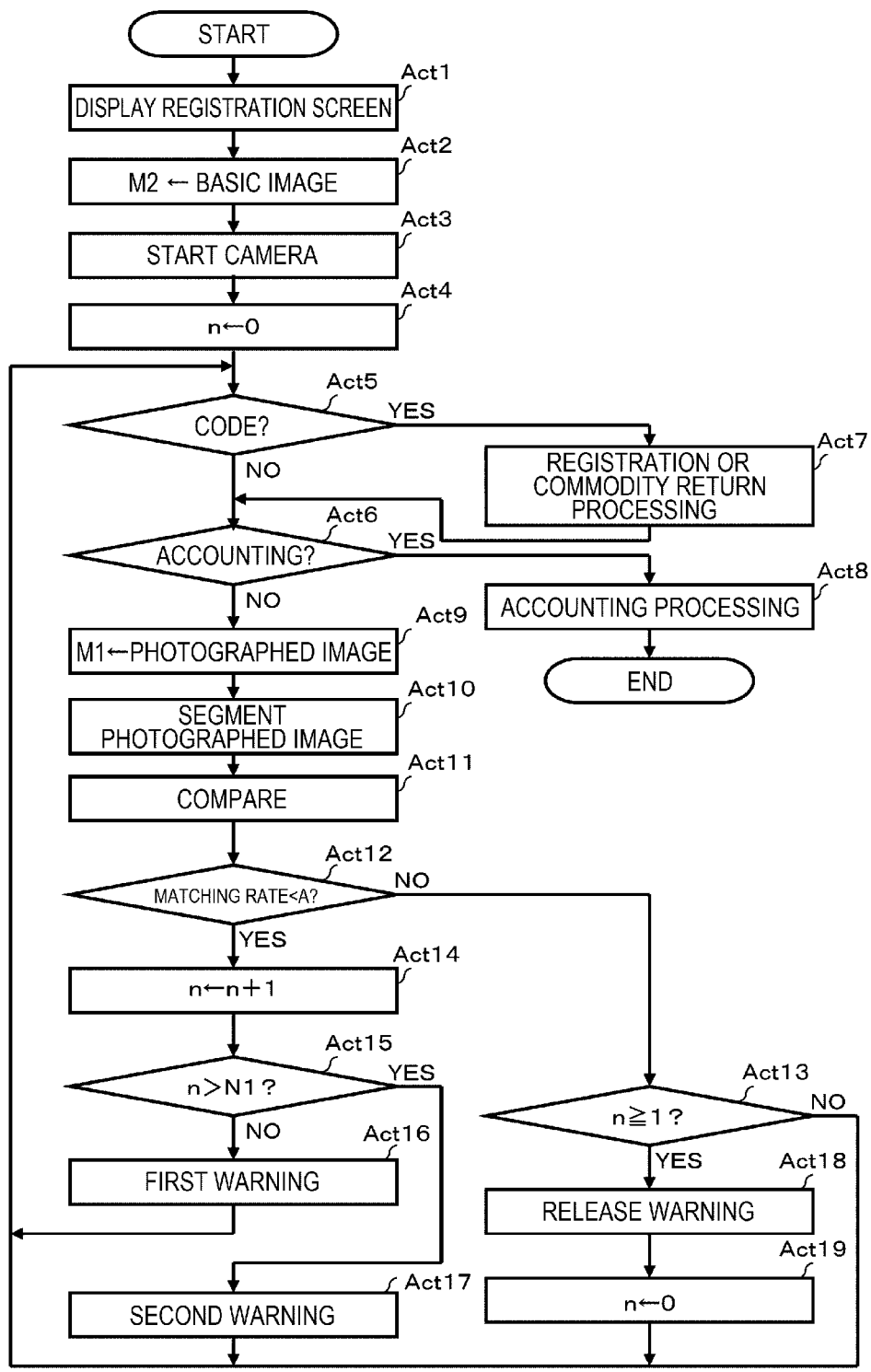
FIG. 7 is a flowchart illustrating a main procedure of processing executed by a processor of the information terminal according to a computer program in the first embodiment.

FIG. 7 is a flowchart illustrating a main procedure of processing executed by the processor 31 of the information terminal 30 according to a computer program. The computer program is stored in the main memory 32 or the auxiliary storage device 33. Content of the processing illustrated in the flowchart of FIG. 7 and explained below is an example. A procedure of the processing is not particularly limited if the same result can be obtained.

In Act 1, the processor 31 causes the touch panel 35 to display a registration screen. The registration screen is, for example, a screen for displaying names, prices, and the like of commodities registered by the information terminal 30. The registration screen includes an image of an accounting button with which the customer instructs accounting of purchased commodities. In Act 2, the processor 31 reads out the basic image P1 from the auxiliary storage device 33 and stores the basic image P1 in a second image memory M2. In Act 3, the processor 31 starts the camera 38. In Act 4, the processor 31 resets the warning counter n of the warning counter memory M3 to "0". The order of the processing in Acts 1 to 4 is not limited to this and may be changed as appropriate. The processor 31 only has to execute the processing in Acts 1 to 4 irrespective of order.

After ending the processing in Acts 1 to 4, the processor 31 proceeds to Act 5. In Act 5, the processor 31 confirms whether an identification code of a commodity is acquired. If an identification code is not acquired, the processor 31 determines NO in Act 5 and proceeds to Act 6. In Act 6, the processor 31 confirms whether the accounting button is touched. If the accounting button is not touched, the processor 31 determines NO in Act 6 and proceeds to Act 9. The processor 31 executes processing in Acts 9 to 19 explained below. After ending the processing in Acts 9 to 19, the processor 31 returns to Act 5.

In Acts 5 and 6, the processor 31 waits for an identification code of a commodity to be acquired or the accounting button to be touched. While waiting, the processor 31 repeatedly executes the processing in Acts 9 to 19.

The customer starts shopping after confirming that the registration screen is displayed on the touch panel 35. If the customer finds a commodity that the customer desires to purchase, the customer causes the scanner 36 to read a code symbol such as a barcode attached to the commodity and then puts the commodity in the basket 60. The code symbol includes an identification code of the commodity to which the code symbol is attached. If a code symbol is not attached to the commodity, the customer operates the touch panel 35 to cause the touch panel 35 to display a list of commodities without code symbols and selects, out of the list, a commodity that the customer desires to purchase. If the commodity is selected, an identification code of the commodity is input. Therefore, the customer puts the commodity in the basket 60.

In the waiting state in Acts 5 and 6, if acquiring the identification code of the commodity via the scanner 36 or the touch panel 35, the processor 31 determines YES in Act 5 and proceeds to Act 7. In Act 7, the processor 31 performs registration processing for purchased commodities.

The processor 31 controls the wireless unit 34 to transmit commodity registration data to the server 10. According to the control, the wireless unit 34 transmits the commodity registration data to the server 10. The commodity registration data includes the acquired identification code of the commodity. The commodity registration data also includes a terminal ID set for each of terminals in order to individually identify the information terminals 30. The server 10 receiving the commodity registration data creates list data of purchased commodities for each of terminals ID of the information terminals 30. The server 10 transmits commodity data such as commodity names and prices of the purchased commodities to the information terminal 30. The processor 31 of the information terminal 30 updates the registration screen such that the commodity data received from the server 10 is displayed on the registration screen.

If the commodity put in the basket 60 is returned, first, the customer operates the touch panel 35 to set a commodity return mode. Subsequently, the customer inputs the identification code of the commodity to the information terminal 30 in the same manner as during the purchase and thereafter returns the commodity to an original shelf. At this time, the processor 31 performs commodity return processing for purchased commodities. The processor 31 controls the wireless unit 34 to transmit commodity return data to the server 10. According to the control, the wireless unit 34 transmits the commodity return data to the server 10. The commodity return data includes the acquired identification code of the commodity. The commodity return data also includes the terminal ID of the information terminal 30. The server 10 receiving the commodity return data deletes data of the returned commodity from list data for each of terminal IDs. The server 10 transmits commodity data such as a commodity name and a price of the returned commodity to the information terminal 30. The processor 31 of the information terminal 30 updates the registration screen such that the commodity data received from the server 10 is deleted from the registration screen.

After ending the registration processing for the purchased commodity or the commodity return processing for the returned commodity, the processor 31 proceeds to Act 6. The processor 31 confirms whether the accounting button is touched. If the accounting button is not touched, the processor 31 executes the processing in Acts 9 to 19. After ending the processing in Acts 9 to 19, the processor 31 returns to Act 5. The processor 31 returns to the waiting state in Acts 5 and 6.

The customer ending the shopping touches the accounting button displayed on the registration screen. In the waiting state in Acts 5 and 6, if detecting that the accounting button is touched via the touch panel 35, the processor 31 determines YES in Act 6 and proceeds to Act 8. In Act 8, the processor 31 performs accounting processing.

The processor 31 controls the wireless unit 34 to transmit accounting instruction data to the server 10. According to the control, the wireless unit 34 transmits the accounting instruction data to the server 10. The accounting instruction data includes the terminal ID of the information terminal 30. The server 10 receiving the accounting instruction data selects the accounting machine 20 that performs accounting. For example, the server 10 selects the accounting machine 20 not in use. The server 10 transmits, to the information terminal 30, data for informing that the accounting is performed by the accounting machine 20. The processor 31 of the information terminal 30 causes, based on the data received from the server 10, the touch panel 35 to display a screen for guiding the customer to the accounting machine 20.

After ending the accounting processing, the processor 31 ends the information processing of the procedure illustrated in the flowchart. Thereafter, if a time in which no operation input is performed exceeds a fixed time, the processor 31 changes to the idle state.

The processing in Acts 9 to 19 executed by the processor 31 in the waiting state in Acts 5 and 6 is specifically explained.

In Act 9, the processor 31 takes in a frame image photographed by the camera 38 and stores the image in the first image memory M1. In Act 10, the processor 31 analyzes the image stored in the first image memory M1 and segments a portion where the upper edge of the basket 60, that is, the upper end portions 63A, 63B, 63C, and 63D are surmised to be reflected. The processor 31 compares the image segmented in Act 11 and the basic image P1 stored in the second image memory M2. For example, the processor 31 collates, for each of pixels, luminance, color components, and the like of the segmented image and the basic image P1 and calculates, for all the pixels, a ratio of matching pixels, that is, a matching rate.

In Act 12, the processor 31 determines whether the matching rate is smaller than a first threshold A. The first threshold A is optional. For example, if a commodity having a large entire length is stood against one sidewall and stored in the basket 60, the upper end portion of the sidewall is sometimes hidden by a part of the commodity if the basket 60 is viewed from above. The matching rate decreases if the upper end portion of the sidewall is hidden by the commodity. However, the angle of view of the camera 38 is not blocked. On the other hand, if the commodity having the large entire length is stood against the front of a lens of the camera 38 and most of the angle of view of the camera 38 is blocked, the matching rate greatly decreases. If the customer intentionally covers the lens with cloth or the like, the matching rate also greatly decreases. The first threshold A is a value for identifying whether the angle of view of the camera 38 is blocked. An administrator of the system sets the first threshold A considering the event explained above.

If the matching rate is equal to or larger than the first threshold A, the processor 31 determines NO in Act 12 and proceeds to Act 13. In Act 13, the processor 31 confirms whether the warning counter n is "1" or more. If the warning counter n is not "1" or more, that is, if a warning is not generated, the processor 31 determines NO in Act 13 and returns to Act 5.

If the matching rate is smaller than the first threshold A, in Act 14, the processor 31 counts up the warning counter n by "1". In Act 15, the processor 31 determines whether the warning counter n exceeds a third threshold N1.

In this embodiment, if the matching rate is smaller than the first threshold A, the processor 31 warns the customer, who is the user of the information terminal 30, that the angle of view of the camera 38 is blocked. However, if a fixed time T elapses while a situation in which the matching rate is smaller than the first threshold A is not improved, the processor 31 notifies the attendant that the angle of view of the camera 38 is blocked. The third threshold N1 is a count value until the warning counter n reaches the fixed time T. It is optional to determine to which degree of time the fixed time T is set.

If the warning counter n does not exceed the third threshold N1, the processor 31 determines NO in Act 15 and proceeds to Act 16. In Act 16, the processor 31 performs a first warning. The first warning is, for example, processing for causing the touch panel 35 of the information terminal 30 to display a message for notifying that the angle of view of the camera 38 is blocked. As the first warning, if the information terminal 30 includes a buzzer, the buzzer may be sounded together with the display of the message. After performing the first warning, the processor 31 returns to Act 5.

If the warning counter n exceeds the third threshold N1, the processor 31 determines YES in Act 15 and proceeds to Act 17. In Act 17, the processor 31 performs a second warning. The second warning includes, for example, in addition to the processing of the first warning, processing for transmitting a warning signal from the wireless unit 34 to the server 10. The warning signal is transmitted from the wireless unit 34 to the server 10 by the processing of the second warning. The warning signal includes an ID of the information terminal 30. The server 10 controls the attendant terminal 40 such that a message for notifying the attendant that the angle of view of the camera 38 is blocked in the information terminal 30 identified by the ID is displayed on the display device of the attendant terminal 40. After performing the second warning, the processor 31 returns to Act 5.

If the matching rate is equal to or larger than the first threshold A and the warning counter n is "1" or more, the processor 31 determines YES in Act 13 and proceeds to Act 18. In Act 18, the processor 31 performs warning release. The first warning is released by the warning release. The message for the warning displayed on the touch panel 35 is erased. If the second warning is performed, the second warning is also released. The same message displayed on the display device of the attendant terminal 40 is erased.

In Act 19, the processor 31 resets the warning counter n to "0". Thereafter, the processor 31 returns to Act 5.

The computer including the processor 31 as the central part configures an acquiring section through the processing in Acts 9 and 10. The computer configures a notifying section through the processing in Acts 11, 12, and 14 to 17.

In this way, in the first embodiment, the processor 31 acquires, from an image photographed by the camera 38 provided in the cart C to be capable of photographing the entire basket 60 placed on the basket receiving section C3 of the cart C, an image in which the upper edge of the basket 60 is surmised to be reflected and stores the image in the first image memory M1. On the other hand, an image of the upper end portions 63A, 63B, 63C, and 63D of the sidewalls 62A, 62B, 62C, and 62D at the time when the basket 60 is viewed from above and the pair of handles 64A and 64B laid on the upper end portions 63A, 63B, 63C, and 63D is stored in the second image memory M2 as the basic image P1.

The processor 31 compares the image in the first image memory M1 and the basic image P1 in the second image memory M2 and calculates a matching rate of the image and the basic image P1. If the matching rate is smaller than the first threshold A, the processor 31 performs the first warning. Consequently, a message for warning that the angle of view of the camera 38 is blocked is displayed on the touch panel 35 of the information terminal 30. Therefore, the customer using the cart C can learn from the message displayed on the touch panel 35 that the angle of view of the camera 38 is blocked.

For example, most of the angle of view of the camera 38 is sometimes blocked because a commodity put in the basket 60 is located in front of the lens of the camera 38. In such a case, the customer confirming the message moves the commodity in the basket 60 not to block the angle of view of the camera 38. As a result, if the matching rate is equal to or larger than the first threshold A, the message is erased. Consequently, the camera 38 can stably photograph a motion of the customer putting a purchased commodity in the basket 60 or a motion of the customer taking out a returned commodity from the basket 60. Therefore, it is possible to improve a monitoring effect by the camera 38.

On the other hand, it is assumed that there is a customer who intentionally covers the lens or an opening of the basket 60 with cloth or the like to prevent the basket 60 from being photographed by the camera 38. Even in such a case, the message for warning that the angle of view of the camera 38 is blocked is displayed on the touch panel 35 of the information terminal 30. However, the customer is considered to neglect the warning and leave the warning as it is. In such a case, in this embodiment, if the waring counter n exceeds the third threshold N1, the processor 31 performs the second warning. Consequently, the message for notifying the attendant that the angle of view of the camera 38 is blocked in the information terminal 30 is displayed on the display device of the attendant terminal 40.

Therefore, for example, the attendant can go to a selling area and advice the customer to remove the cloth or the like covering the lens of the camera 38 or the opening of the basket 60. By widely informing customers that such an advice is performed, it is possible to prevent an improper act of intentionally covering the lens or the opening of the basket 60 with cloth or the like. Therefore, it is possible to further improve the monitoring effect by the camera 38.

Second Embodiment

A second embodiment is explained.

In the first embodiment, the image showing the upper edge of the basket 60 placed on the basket receiving section C3 is set as the basic image P1. In the second embodiment, in an initial stage, an image showing the empty basket 60 placed on the basket receiving section C3 is set as a basic image P2. Every time an event occurs in which a state of the storing section 63 of the basket 60 changes, the basic image P2 is updated to an image after the change. The portions explained with reference to FIGS. 1 to 5 in the first embodiment are common to the second embodiment. Therefore, the same portions are denoted by the same reference numerals and signs and explanation of the portions is omitted.

Figure 8:
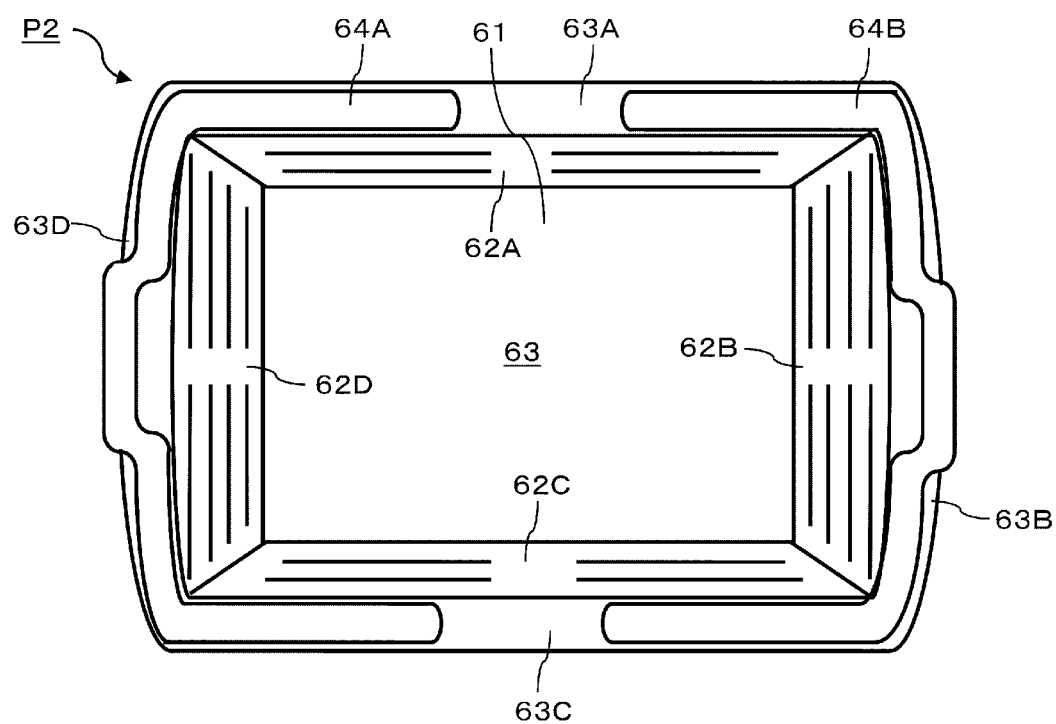
FIG. 8 is a schematic diagram for explaining a basic image in a second embodiment.

FIG. 8 is an example of the basic image P2 in the initial stage. As illustrated in FIG. 8, the basic image P2 shows the bottom wall 61, the sidewalls 62A, 62B, 62C, and 62D of the four surfaces, the upper end portions 63A, 63B, 63C, and 63D of the sidewalls 62A, 62B, 62C, and 62D, and the C-shaped pair of handles 64A and 64B of the basket 60. The storing section 63 is empty.

The information terminal 30 stores the basic image P2 in the auxiliary storage device 33. The information terminal 30 acquires, from an image photographed by the camera 38, an image including a region where the storing section 63 of the basket 60 is surmised to be reflected. The information terminal 30 recognizes an event in which a state of the storing section 63 of the basket 60 changes. The information terminal 30 recognizes an event in which a commodity is put in the storing section 63 or an event in which a commodity is removed from the storing section 63.

If recognizing such an event, the information terminal 30 compares the acquired image and the basic image P2 and calculates a degree of the change. At this time, if the degree of the change is larger than a second threshold B, the information terminal 30 updates the basic image P2 to the acquired image. If recognizing, again, the event in which the storing section 63 of the basket 60 changes, the information terminal 30 compares an image acquired anew and the basic image P2 after the update and calculates a degree of a change. At this time, if the degree of the change is equal to or smaller than the second threshold B, the information terminal 30 determines that the angle of view of the camera 38 is blocked and notifies the customer or the attendant. The information terminal 30 has a function of a camera abnormality detecting device.

Operation in the second embodiment explained above is specifically explained below.

In the second embodiment, as in the first embodiment, a customer who performs shopping using the cart C places the empty basket 60 on the basket receiving section C3. The customer touches the touch panel 35. If the touch panel 35 is touched, the processor 31 in the idle state starts. The processor 31 starts information processing of a procedure illustrated in FIG. 9.

Figure 9:
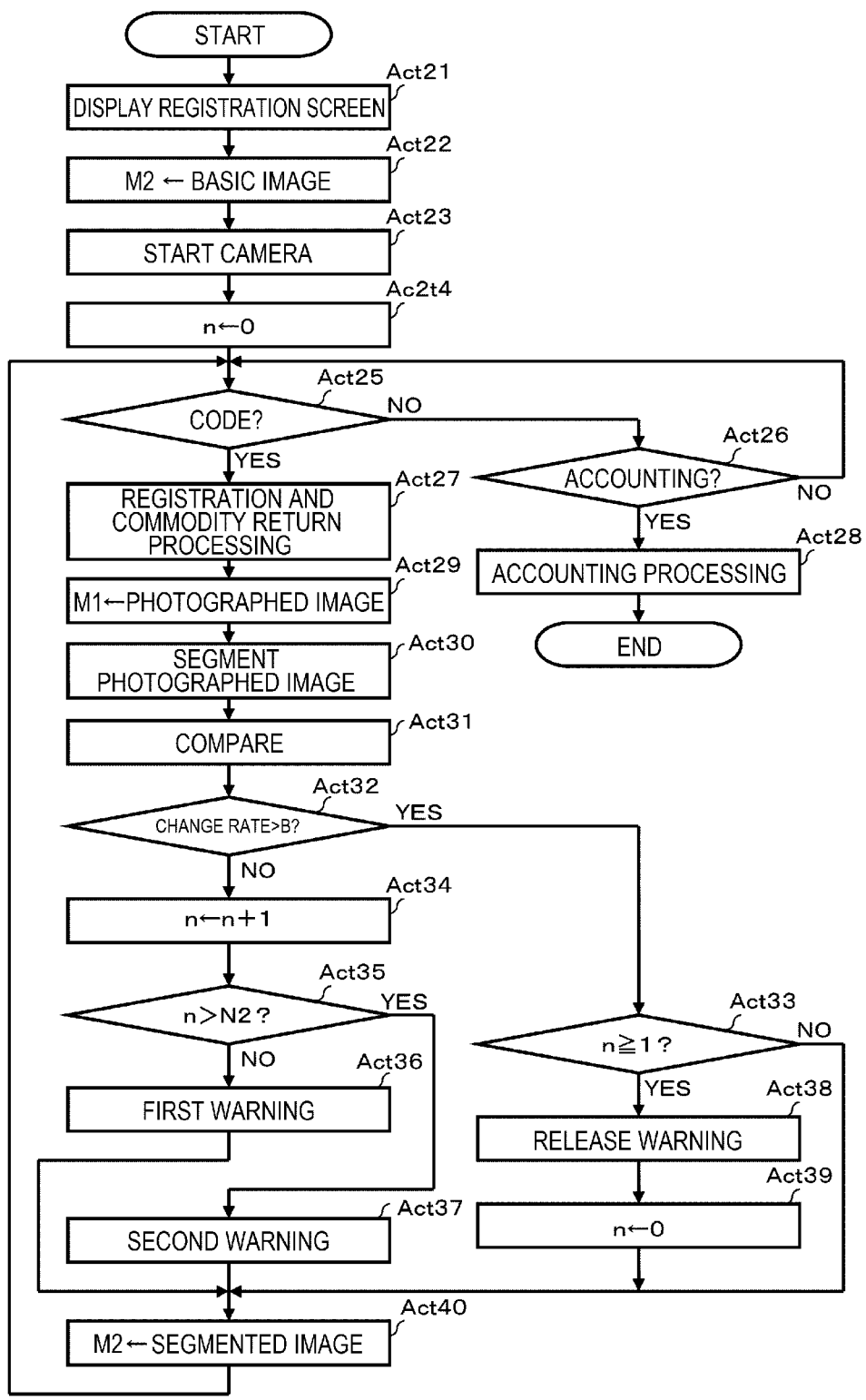
FIG. 9 is a flowchart illustrating a main procedure of processing executed by a processor of an information terminal according to a computer program in the second embodiment.

FIG. 9 is a flowchart illustrating a main procedure of processing executed according to a computer program by the processor 31 of the information terminal 30. The computer program is stored in the main memory 32 or the auxiliary storage device 33. Content of processing illustrated in the flowchart of FIG. 9 and explained below is an example. A procedure of the processing is not particularly limited if the same result can be obtained.

In Act 21, the processor 31 causes the touch panel 35 to display a registration screen. The registration screen is common to the first embodiment. In Act 22, the processor 31 reads out the basic image P2 from the auxiliary storage device 33 and stores the basic image P2 in the second image memory M2. In Act 23, the processor 31 starts the camera 38. In Act 24, the processor 31 resets the warning counter n of the warning counter memory M3 to "0". The order of the processing in Acts 21 to 24 is not limited to this and may be changed as appropriate. The processor 31 only has to execute the processing in Acts 21 to 24 irrespective of order.

After ending the processing in Acts 21 to 24, the processor 31 proceeds to Act 25. In Act 25, the processor 31 confirms whether an identification code of a commodity is acquired. If an identification code is not acquired, the processor 31 determines NO in Act 25 and proceeds to Act 26. In Act 26, the processor 31 confirms whether the accounting button of the registration screen is touched. If the accounting button is not touched, the processor 31 determines NO in Act 26 and returns to Act 25.

In Acts 25 and 26, the processor 31 waits for an identification code of a commodity to be acquired or the accounting button to be touched. In this waiting state, if acquiring an identification code of a commodity via the scanner 36 or the touch panel 35, the processor 31 determines YES in Act 25 and proceeds to Act 27. In Act 27, as in the first embodiment, the processor 31 performs the registration processing or the commodity return processing for the purchased commodity.

After ending the registration processing or the commodity return processing for the purchased commodity, the processor 31 proceeds to Act 29. The processor 31 executes processing in Acts 29 to 40. The processing in Acts 29 to 40 is explained below.

In the waiting state in Acts 25 and 26, if detecting that the accounting button is touched via the touch panel 35, the processor 31 determines YES in Act 26 and proceeds to Act 28. In Act 28, the processor 31 performs the accounting processing as in the first embodiment. After ending the accounting processing, the processor 31 ends the information processing of the procedure illustrated in the flowchart. Thereafter, if a time in which no operation input is performed exceeds a fixed time, the processor 31 changes to the idle state.

The processing in Acts 29 to 40 executed by the processor 31 is specifically explained.

After ending the registration processing or the commodity return processing for the purchased commodity, in Act 29, the processor 31 takes in a frame image photographed by the camera 38 and stores the image in the first image memory M1. In Act 30, the processor 31 analyzes the image stored in the first image memory M1 and segments a portion where an entire region including the storing section 63 of the basket 60 is surmised to be reflected. The processor 31 compares the image segmented in Act 31 and the basic image P2 stored in the second image memory M2. For example, the processor 31 collates, for each of pixels, luminance, color components, and the like of the segmented image and the basic image P2 and calculates, for all the pixels, a ratio of changed pixels, that is, a change rate.

In Act 32, the processor 31 determines whether the change rate is smaller than a second threshold B. The second threshold B is optional. For example, if a commodity is put in the storing section 63 of the basket 60, a change occurs in an image of the storing section 63 before and after the commodity is put in the storing section 63. On the other hand, if the lens of the camera 38 is blocked, even if a commodity is put in the storing section 63, a change does not occur in a photographed image before and after the commodity is put in the storing section 63. The same applies if a commodity is removed from the storing section 63. The second threshold B is a value for identifying whether the angle of view of the camera 38 is blocked. The administrator of the system sets the second threshold B considering the event explained above.

If the change rate is larger than the second threshold B, the processor 31 determines YES in Act 32 and proceeds to Act 33. In Act 33, the processor 31 confirms whether the warning counter n is "1" or more. If the warning counter n is not "1" or more, that is, if a warning is not generated, the processor 31 determines NO in Act 33 and proceeds to Act 40.

On the other hand, if the change rate is equal to or smaller than the second threshold B, in Act 32, the processor 31 determines NO in Act 32 and proceeds to Act 34. In Act 34, the processor 31 counts up the warning counter n by "1". In Act 35, the processor 31 determines whether the warning counter n exceeds a fourth threshold N2.

In this embodiment, if the change rate is equal to or smaller than the second threshold B, the processor 31 warns the user of the information terminal 30 that the angle of view of the camera 38 is blocked. However, if a fixed number of times K of the registration processing or the commodity return processing is carried out while a situation in which the change rate is equal to or smaller than the second threshold B is not improved, the processor 31 notifies the attendant that the angle of view of the camera 38 is blocked. The fourth threshold N2 is a value smaller than the fixed number of times K by "1". It is optional to determine to how many times the fixed number of times K is set.

If the warning counter n does not exceed the fourth threshold N2, the processor 31 determines NO in Act 35 and proceeds to Act 36. In Act 36, the processor 31 performs the first warning. Content of the first warning may be the same as the content of the first warning in the first embodiment. After performing the first warning, the processor 31 proceeds to Act 40.

If the warning counter n exceeds the fourth threshold N2, the processor 31 determines YES in Act 35 and proceeds to Act 37. In Act 37, the processor 31 performs the second warning. Content of the second warning may be the same as the content of the second warning in the first embodiment. After performing the second warning, the processor 31 proceeds to Act 40.

If the change rate is larger than the second threshold B and the warning counter n is "1" or more, the processor 31 determines YES in Act 33 and proceeds to Act 38. In Act 38, the processor 31 performs the warning release as in the first embodiment. In Act 39, the processor 31 resets the warning counter n to "0". Thereafter, the processor 31 proceeds to Act 40.

In this way, if the warning counter n is "0" in Act 33 or after ending the processing in Act 36, 37, or 39, the processor 31 proceeds to Act 40. In Act 40, the processor 31 stores the image segmented in the processing in Act 30 in the second image memory M2. The processor 31 updates the basic image P2 stored in the second image memory M2 to an image in which the entire region including the storing section 63 of the basket 60 is surmised to be reflected at that point in time.

If the basic image P2 stored in the second image memory M2 is changed to an image including the storing section 63 of the basket 60 after the registration processing or the commodity return processing is performed in this way, the processor 31 returns to Act 25. Therefore, if the processor 31 acquires an identification code of a commodity anew and performs the registration processing or the commodity return processing with the identification code, the processor 31 executes the processing in Acts 29 to 40 again.

The computer including the processor 31 as the central part configures a recognizing section through the processing in Acts 25 and 27. The computer configures an acquiring section through the processing in Acts 29 and 30. The computer configures a notifying section through the processing in Acts 31, 32, and 34 to 37.

In this way, in the second embodiment, if an identification code of the purchased commodity or the returned commodity is input via the scanner 36 or the touch panel 35 and the processor 31 executes the registration or commodity return processing based on the identification code, the processor 31 recognizes that an event occurs in which a commodity stored in the basket 60 changes. The processor 31 compares an image including the storing section 63 of the basket 60 before the event occurs, that is, an image stored in the second memory M2 and an image including the storing section 63 of the basket 60 after the event occur, that is, an image stored in the first image memory M1. As a result, if determining that a change rate between the images is larger than the second threshold B, the processor 31 determines that the angle of view of the camera 38 is not blocked.

Figure 10:
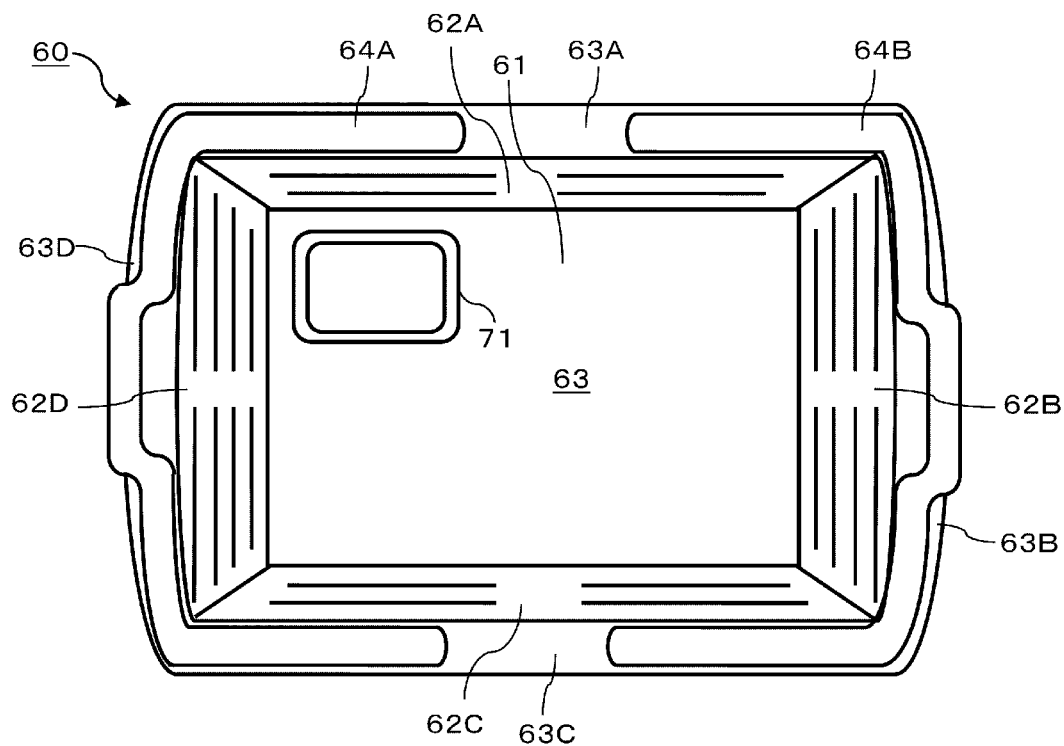
FIG. 10 is a schematic diagram illustrating a first state in which a commodity is stored in a basket in the second embodiment.
Figure 11:
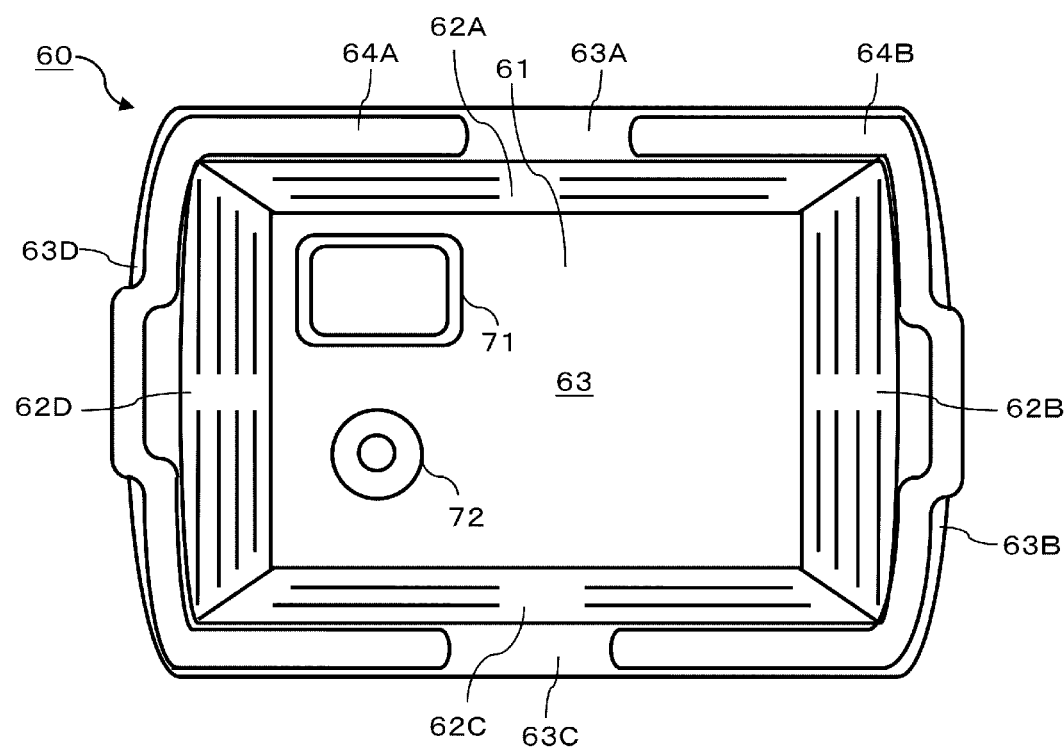
FIG. 11 is a schematic diagram illustrating a second state in which commodities are stored in the basket in the second embodiment.

For example, a state in which a commodity 71 is stored in the storing section 63 of the basket 60 as illustrated in FIG. 10 is represented as a first state and a state in which the commodity 71 and a commodity 72 are stored in the storing section 63 as illustrated in FIG. 11 is represented as a second state. In this example, if the commodity 72 is stored and the first state changes to the second state, an image photographed by the camera 38 also changes from an image in the first state to an image in the second state. Similarly, if the commodity 72 is removed and the second state changes to the first state, the image photographed by the camera 38 also changes from the image in the second state to the image in the first state.

If the processor 31 recognizes that the image photographed by the camera 38 changes in this way, the warning processing is not performed in the information terminal 30. However, if the angle of view of the camera 38 is blocked, the image photographed by the camera 38 does not change even if the first state changes to the second state or the second state changes to the first state. At this time, the processor 31 performs the first warning and further performs the second warning. Therefore, in the second embodiment, the same action effects as the action effects in the first embodiment can be obtained.

The embodiments of the camera abnormality detecting device that can detect, on a real-time basis, a situation in which the angle of view of the camera 38 is blocked and can improve a monitoring effect by the camera 38 are explained above. However, such embodiments is not limited to this.

For example, in the first embodiment, the image of the upper end portions 63A, 63B, 63C, and 63D of the sidewalls 62A, 62B, 62C, and 62D at the time when the basket 60 is viewed from above and the pair of handles 64A and 64B laid on the upper end portions 63A, 63B, 63C, and 63D is set as the basic image P1. As another embodiment, an image of the upper end portions 63A, 63B, 63C, and 63D of the sidewalls 62A, 62B, 62C, and 62D at the time when the basket 60 is viewed from above may be set as the basic image P1.

In the first or second embodiment, the second warning includes, in addition to the processing of the first warning, the processing for transmitting the warning signal from the wireless unit 34 to the server 10. As another embodiment, the processing of the first warning is stopped and only the processing for transmitting the warning signal from the wireless unit 34 to the server 10 is performed. In that case as well, the message for notifying the attendant that the angle of view of the camera 38 is blocked in the information terminal 30 is displayed on the display device of the attendant terminal 40. Therefore, it is possible to improve a situation in which the angle of view of the camera 38 is blocked by the attendant.

In the first or second embodiment, as an example, the situation in which the angle of view of the camera 38 is blocked is detected as abnormality. As another embodiment, it is conceivable to detect, as normality, a situation in which the angle of view of the camera 38 is not blocked and notify the normality to the customer or the attendant. For example, in the first embodiment, if the matching rate is equal to or larger than the first threshold A in Act 12 in FIG. 7, a message for notifying a normal state in which the angle of view of the camera 38 is not blocked is displayed on the touch panel 35 and notified to the attendant terminal 40. Consequently, if the message is not displayed, the customer or the attendant can determine that the angle of view of the camera 38 is blocked.

Transfer of a computer program to the information terminal 30 can be performed by recording the computer program in a removable recording medium or can be performed by communication via a network. A form of the recording medium may be any form if, like a CD-ROM, a memory card, or the like, the recording medium can store the computer program and can be read by a device.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A camera abnormality detecting device comprising:
an acquiring component configured to acquire, from an image photographed by a camera provided in a conveyance body for photographing an inside of a basket placed on a basket receiving section of the conveyance body, an image of a region where an upper edge of the basket is surmised to be reflected; and
a notifying component configured to notify, based on the image acquired by the acquiring section, whether an angle of view of the camera is blocked,
wherein the notifying component notifies, according to a matching rate of the image acquired by the acquiring component and a basic image showing the upper edge of the basket, whether the angle of view of the camera is blocked.

2. The device according to claim 1, wherein the notifying component notifies that the angle of view of the camera is blocked if the matching rate of the image acquired by the acquiring component and the basic image showing the upper edge of the basket is smaller than a first threshold and adds or changes a notification destination if a state in which the matching rate is smaller than the first threshold continues for a fixed time or more.

3. The device according to claim 1, wherein the notifying component is further configured to notify a possible remedy if the angle of view of the camera is blocked.

4. The device according to claim 1, wherein the notifying component notifies using a sound signal.

5. The device according to claim 1, wherein the notifying component notifies using a light signal.

6. A POS system comprising the device according to claim 1.

7. A camera abnormality detecting device comprising:
an acquiring component configured to acquire, from an image photographed by a camera provided in a conveyance body for photographing an inside of a basket placed on a basket receiving section of the conveyance body, an image of a region where an inside of the basket is surmised to be reflected;
a recognizing component configured to recognize an event in which a commodity stored in the basket changes; and
a notifying component configured to notify, from a degree of a change of images acquired by the acquiring component before and after the event occurs, whether an angle of view of the camera is blocked,
wherein the notifying component notifies that the angle of view of the camera is blocked if the degree of the change of the image is larger than a second threshold and adds or changes a notification destination if a state in which the degree of the change is larger than the second threshold continues for a fixed time or more.

8. The device according to claim 7, wherein the notifying component is further configured to notify a possible remedy if the angle of view of the camera is blocked.

9. The device according to claim 7, wherein the notifying component notifies using a sound signal.

10. The device according to claim 7, wherein the notifying component notifies using a light signal.

11. A POS system comprising the device according to claim 7.

12. A camera abnormality detecting method comprising:
acquiring, from an image photographed by a camera provided in a conveyance body for photographing an inside of a basket placed on a basket receiving section of the conveyance body, an image of a region where an upper edge of the basket is surmised to be reflected; and
notifying, based on the acquired image, whether an angle of view of the camera is blocked, wherein notifying is according to a matching rate of the image acquired by the acquiring component and a basic image showing the upper edge of the basket, whether the angle of view of the camera is blocked.

13. The method according to claim 12, wherein the notifying is executed when the angle of view of the camera is blocked if the matching rate of the image acquired by the acquiring component and the basic image showing the upper edge of the basket is smaller than a first threshold and adds or changes a notification destination if a state in which the matching rate is smaller than the first threshold continues for a fixed time or more.

14. The method according to claim 12, further comprising notifying a possible remedy if the angle of view of the camera is blocked.

15. The method according to claim 12, wherein notifying comprises using a sound signal.

16. The method according to claim 12, wherein notifying comprises using a light signal.

17. A camera abnormality detecting device comprising:
an acquiring component configured to acquire, from an image photographed by a camera provided in a conveyance body for photographing an inside of a basket placed on a basket receiving section of the conveyance body, an image of a region where an upper edge of the basket is surmised to be reflected; and
a notifying component configured to notify, based on the image acquired by the acquiring section, whether an angle of view of the camera is blocked,
wherein the notifying component is further configured to notify a possible remedy if the angle of view of the camera is blocked.

18. The device according to claim 17, wherein the notifying component notifies, according to a matching rate of the image acquired by the acquiring component and a basic image showing the upper edge of the basket, whether the angle of view of the camera is blocked.

19. The device according to claim 17, wherein the notifying component notifies using a sound signal.

20. The device according to claim 17, wherein the notifying component notifies using a light signal.

21. A POS system comprising the device according to claim 17.

* * * * *